(12) United States Patent
Damron et al.

(10) Patent No.: US 6,578,111 B1
(45) Date of Patent: Jun. 10, 2003

(54) CACHE MEMORY SYSTEM AND METHOD FOR MANAGING STREAMING-DATA

(75) Inventors: Peter C. Damron, Fremont, CA (US); Patricia Shanahan, San Diego, CA (US); Aleksandr Guzovskiy, Lowell, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 253 days.

(21) Appl. No.: 09/677,093

(22) Filed: Sep. 29, 2000

(51) Int. Cl.⁷ .............................................. G06F 12/00
(52) U.S. Cl. ...................................................... 711/133
(58) Field of Search .................................. 711/133, 134

(56) References Cited

U.S. PATENT DOCUMENTS

| | | | |
|---|---|---|---|
| 4,928,239 A | 5/1990 | Baum et al. | 364/200 |
| 5,185,878 A | 2/1993 | Baror et al. | 395/425 |
| 5,325,504 A | 6/1994 | Tipley et al. | 395/425 |
| 5,353,425 A * | 10/1994 | Malamy et al. | 711/144 |
| 5,390,318 A | 2/1995 | Ramakrishnan et al. | 395/425 |
| 5,491,810 A | 2/1996 | Allen | 395/444 |
| 5,546,559 A | 8/1996 | Kyushima et al. | 395/460 |
| 5,564,035 A | 10/1996 | Lai | 395/471 |
| 5,652,858 A | 7/1997 | Okada et al. | 395/464 |
| 5,721,865 A | 2/1998 | Shintani et al. | 395/464 |
| 5,732,242 A * | 3/1998 | Mowry | 711/136 |
| 5,778,432 A | 7/1998 | Rubin et al. | 711/135 |
| 5,778,435 A | 7/1998 | Berenbaum et al. | 711/137 |
| 5,822,757 A * | 10/1998 | Chi | 711/129 |
| 5,829,025 A * | 10/1998 | Mittal | 711/122 |
| 5,890,221 A | 3/1999 | Liu et al. | 711/210 |
| 5,925,100 A | 7/1999 | Drewry et al. | 709/219 |
| 5,937,429 A | 8/1999 | Kumar et al. | 711/133 |
| 5,944,815 A | 8/1999 | Witt | 712/207 |
| 6,065,100 A | 5/2000 | Schafer et al. | 711/137 |
| 6,202,129 B1 * | 3/2001 | Palanca et al. | 711/133 |
| 6,223,256 B1 * | 4/2001 | Gaither | 711/134 |
| 6,314,490 B1 * | 11/2001 | Morein | 711/3 |

OTHER PUBLICATIONS

Karlsson et al., "*A Prefetching Technique for Irregular Accesses to Linked Data Structures*", pp. 206–217, 1999 IEEE, Dept. of Computer Engineering, Chalmers University of Technology, Sweden.

Unknown, "*Conditional Least–Recently–Used Data Cache Design to Support Multimedia Applications*", pp. 387–389, vol. 37, No. 02B, Feb. 1994, IBM Technical Disclosure Bulletin, New York, NY.

* cited by examiner

*Primary Examiner*—Kevin Verbrugge
(74) *Attorney, Agent, or Firm*—Martine & Penilla, LLP

(57) ABSTRACT

A system and method are provided for efficient handling of streaming-data in a cache memory system (105) having a cache with several cache-lines (160) capable of storing data. In one aspect, a method is provided for determining before storing data to a cache-line if the storing of data will replace earlier data already stored in cache (135). If the storing of data will replace data in the cache (135), it is determined if the data that will be replaced is streaming-data. If the data to be replaced is not streaming-data, it is stored into victim cache (155). However, if the data to be replaced is streaming-data, it is not stored into the victim cache, thereby improving system efficiency by eliminating the copying of data to be replaced and avoiding replacing other earlier data in victim cache (155) that may be needed in the future.

9 Claims, 7 Drawing Sheets

Fig. 9

CACHE MEMORY SYSTEM AND METHOD FOR MANAGING STREAMING-DATA

CROSS REFERENCE TO RELATED APPLICATIONS

This application is related to commonly assigned, co-pending U.S. patent application Ser. No. 09/677,096 entitled SYSTEM AND METHOD FOR IDENTIFYING STREAMING-DATA filed on Sep. 29, 2000 and Ser. No. 09/766,092 entitled SYSTEM AND METHOD FOR A SOFTWARE CONTROLLED CACHE filed on Sep. 29, 2000 both of which are incorporated herein by reference.

FIELD

The present invention relates generally to memory systems, and more particularly to cache memory systems and a method of operating the same that provides efficient handling of streaming-data.

BACKGROUND

Modern computer systems generally include a central processing unit (CPU) or processor for processing data and a memory system for storing operating instructions and data. Typically, the speed at which the processor is able to decode and execute instructions to process data exceeds the speed at which instructions and data is transferred between the memory system and the processor. Thus, the processor is often forced to wait for the memory system to respond. One way of reducing this memory latency period is to organize computer memory into a memory hierarchy. A memory hierarchy consists of multiple levels of memory each using different devices for storing data and each having different speeds, capacities and cost associated therewith. Generally, the highest-level of memory, commonly known as a cache, is coupled closely to the processor and uses relatively expensive, faster devices that make information, either data or instructions, available to the processor in a shorter period of time. The lower-levels typically include a main-memory and mass-data-storage devices that albeit larger are slower and are therefore correspondingly cheaper.

Use of a cache reduces the memory latency period by temporarily storing a small subset of data from lower-levels of the memory system. When the processor needs information for an application, it first checks the high-speed cache. If the information is found in the cache (known as a cache-hit), the information will be retrieved from the cache and execution of the application will resume. If the information is not found in the cache (known as a cache-miss) then the processor will proceed to access the slower, lower-level memories. Information accessed in the lower-level memories is simultaneously stored or written in the cache so that should the information be required again in the future it is obtained directly from the cache, thereby reducing or eliminating any memory latency period.

Similarly, use of a cache can reduce the memory latency period during a write operation by writing to the cache. This reduces the memory latency period in two ways. First, by enabling the processor to write at the much greater speed of the cache, and second by storing or loading the information in the cache so that, again, should the processor need the information in the future it is obtained directly from the cache.

There are three primary types of technology used in memories today. The main-memory is typically implemented using slower, cheaper dynamic random access memory (DRAM) devices. The cache is implemented using faster random access memory devices, such as static random access memory devices (SRAMs) so that accessing a cache takes much less time to complete than to access main-memory. SRAMs typically require greater number of devices per bit of information stored, and thus are more expensive than DRAM. In order to further reduce the memory latency period the cache may be located on the same chip as the CPU. The proximity of the cache to the CPU increases the speed with which the CPU can access the cache by eliminating delays due to transmission over external circuits. A cache located on the same chip as the CPU is often known as primary or level 1 (L1) cache since the memory system typically includes a larger, slower level 2 (L2) cache outside the CPU chip. Some memory systems include additional caches, for example a level (L3) or victim cache for temporarily storing data displaced from the L2 cache.

As the name implies, at the lowest-level in memory, mass-storage-devices provide the largest data storage capacity and typically use the slowest and therefore cheapest technology. For example, magnetic, optical or magnetic-optical technologies to store large amounts of instructions and data on tapes, or fixed or removable disks.

Figure 1:
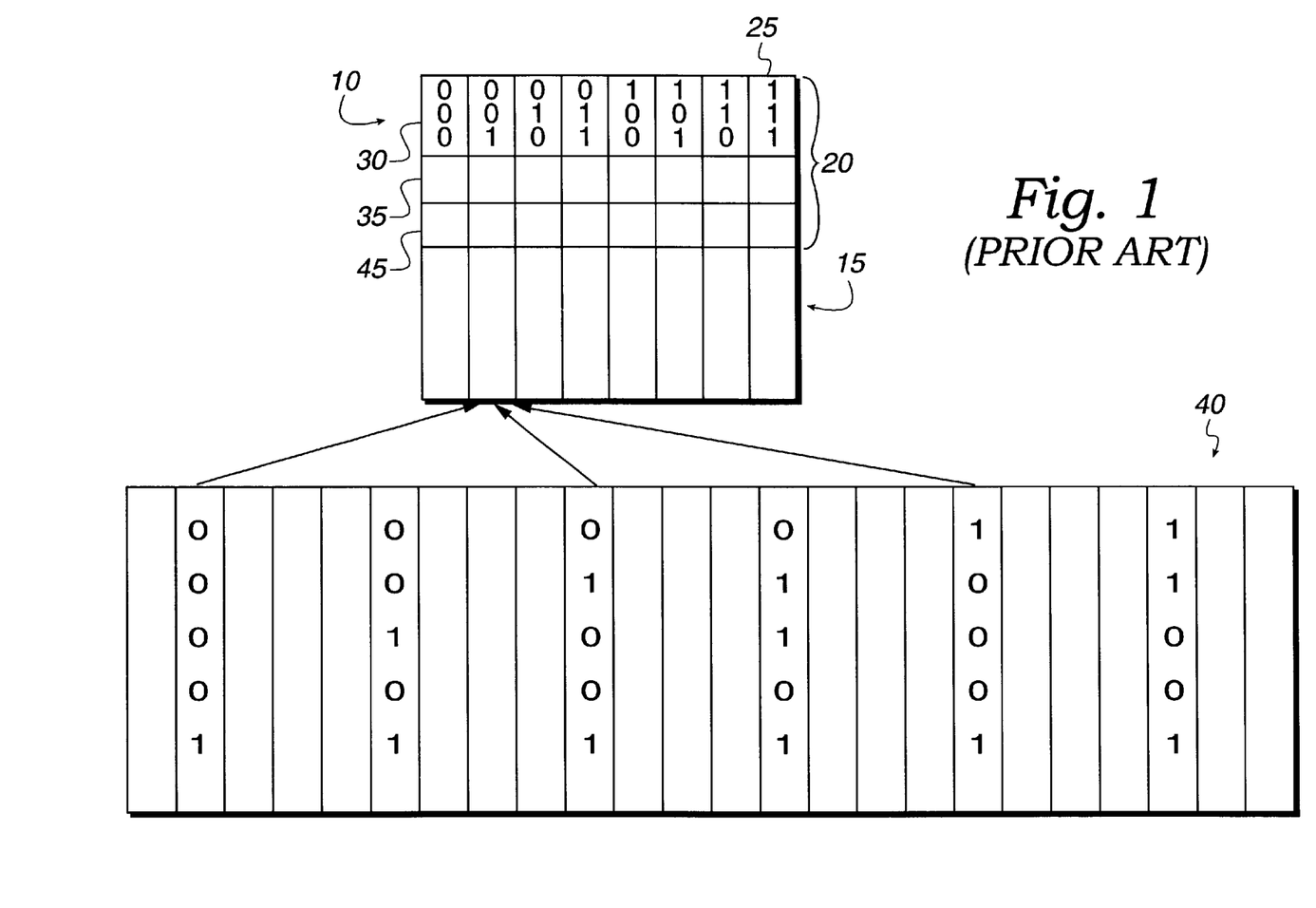
FIG. 1 (prior art) is a diagram showing a cache having a number of cache-lines each having a tag-field associated therewith, and each capable of storing multiple blocks of data.

Referring to FIG. 1, cache 10 is divided logically into two main components or functional units. Data-store 15, where the cached information is actually stored, and tag-field 20, a small area of memory used by the cache to keep track of the location in the memory where the associated data can be found. The data-store is structured or organized as a number of cache-lines 25 or sets of cache-lines each having a tag-field 20 associated therewith, and each capable of storing multiple blocks or bytes of data. Typically, in modern computers each cache-line 25 stores 32 or 64 bytes of data. The tag-field 20 for each cache-line 25 or set of cache-lines includes an index 30 that uniquely identifies each cache-line in the cache 10, and tag 35 that is used in combination with the index to identify an address in lower-level memory 40 from which data-stored in the cache-line has been read from or written to. Often the index 30 is not stored in the cache 10 but is implicit, with the address of the cache-line 25 itself providing the index. Typically, the tag-field 20 for each cache-line 25 also includes one or more bits, commonly known as a validity-bit 45, to indicate whether the cache-line contains valid data. In addition, the tag-field 20 may contain other bits (not shown) for example for indicating whether data at the location is dirty, that is has been modified but not written back to lower-level memory 40.

To speed up memory access operations, caches rely on principles of temporal and spacial-locality. These principles of locality are based on the assumption that, in general, a computer program accesses only a relatively small portion of the information available in computer memory in a given period of time. In particular, temporal locality holds that if some information is accessed once, it is likely to be accessed again soon, and spatial locality holds that if one memory location is accessed then other nearby memory locations are also likely to be accessed. Thus, in order to exploit temporal-locality, caches temporarily store information from a lower-level memory the first time it is accessed so that if it is accessed again soon it need not be retrieved from the lower-level memory. To exploit spatial-locality, caches transfer several blocks of data from contiguous addresses in lower-level memory, besides the requested block of data, each time data is written in the cache from lower-level memory.

The most important characteristics of a cache are its hit rate, that is the fraction of all memory accesses that are satisfied from the cache over a given period of time, and its access time, that is the time it takes to read from or write to the cache. These in turn depend in large part on how the cache is mapped to addresses in the lower-level memory. The choice of mapping technique is so critical to the design of the cache that the cache is often named after this choice. There are generally three different ways to map the cache to the addresses in memory.

Direct-mapping, shown in FIG. 1, is the simplest way to map a cache to addresses in main-memory. In the direct-mapping method the number of cache-lines is determined, the addresses in memory divided into the same number of groups of addresses, and addresses in each group associated with one cache-line. For example, for a cache having $2^n$ cache-lines, the addresses are divided into $2^n$ groups and each address in a group associated with a single cache-line. The lowest n address bits of an address corresponds to the index of the cache-line to which data from the address is stored. The remaining top address bits are stored as a tag that identifies from which of the several possible addresses in the group the data originated. For example, to map a 64 megabyte (MB) main-memory to a 512 kilobyte (KB) direct mapped cache having 16,384 cache-lines, each cache-line is shared by a group of 4,096 addresses in main-memory. To address 64-MB of memory requires 26 address bits since 64-MB is 226 bytes. The lowest five of these address bits, A0 to A4, are ignored in the mapping process, although the processor will use them later to determine which of the 32 bytes of data in the cache-line to accesses. The next 14 address bits, A5 to A18, provide the index of the cache-line to which the address is mapped. Because any cache-line can hold data from any one of 4,096 possible addresses in main-memory, the next seven highest address bits, A19 to A25, are used as a tag to identify to the processor which of the addresses the cache-line holds data from. This scheme, while simple, has the disadvantage that if the program alternately accesses different addresses which map to the same cache location, i.e., addresses within the same group, then it will suffer a cache-miss on every access to these locations.

A fully-associative mapped cache (not shown) avoids the cache conflict of the directly mapped cache by allowing blocks of data from any address in main-memory to be stored anywhere in the cache. However, one problem with fully associative caches is that the whole main-memory address must be used as a tag, thereby increasing the size of the tag-field and reducing cache capacity for storing data. Also, because the requested address must be compared simultaneously (associatively) with all tags in the cache, the access time for the cache is increased.

Figure 2:
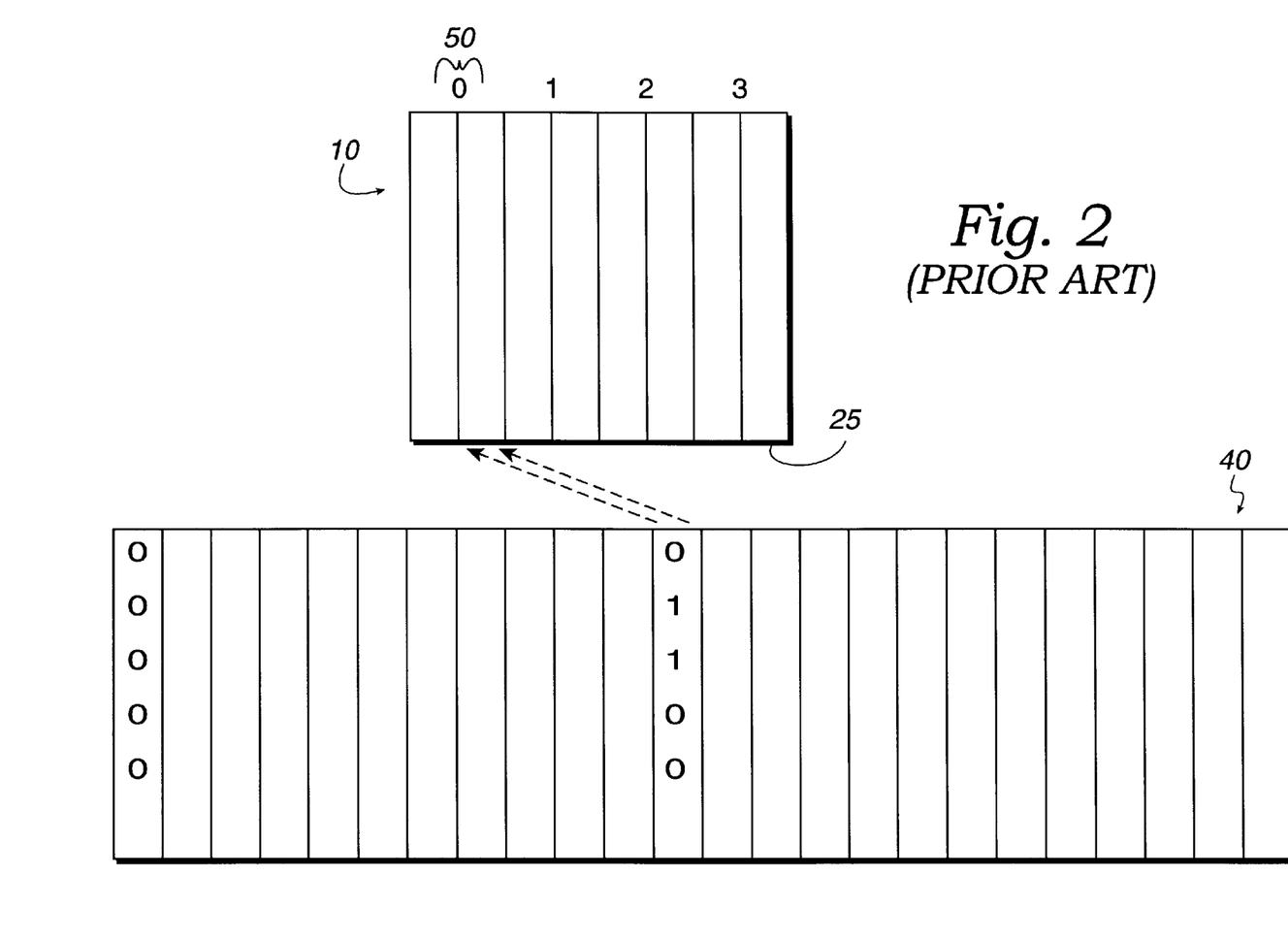
FIG. 2 (prior art) is a diagram showing an example of a 2-way set associative cache.

A set associative cache, shown in FIG. 2, is a compromise between the direct mapped and fully associative designs. In this design, the cache 10 is broken into sets 50 each having a number, 2, 4, 8 etc., of cache-lines 25 and each address in main-memory 40 is assigned to a set and is able to be stored in any one of the cache-lines within the set. Typically, such a cache is referred to as a n-way set associative cache where n is the number of cache-lines in each set. FIG. 2 shows an example of a 2-way set associative cache.

Memory addresses are mapped in the cache in a manner similar to the directly mapped cache. For example, to map a 64-MB main-memory having 26 address bits to a 512-KB 4-way set associative cache the cache is divided into 4,096 sets of 4 cache-lines each and 16,384 addresses in main-memory associated with each set. Address bits A5 to A16 of a memory address represent the index of the set to which the address maps to. The memory address could be mapped to any of the four cache-lines in the set. Because any cache-line within a set can hold data from any one of 16,384 possible memory addresses, the next nine highest address bits, A17 to A25, are used as a tag to identify to the processor which of the memory addresses the cache-line holds data from. Again, the lowest five address bits, A0 to A4, are ignored in the mapping process, although the processor will use them later to determine which of the 32 bytes of data in the cache-line to accesses.

When a fully associative or a set associative cache is full and it is desired to store another cache-line of data in the cache then a cache-line is selected to be written-back or flushed to main-memory or to a lower-level victim cache. The new data is then stored in place of the flushed cache-line. The cache-line to be flushed is chosen based on a replacement policy implemented via a replacement algorithm.

There are various different replacement algorithms that can be used. The most commonly utilized replacement algorithm is known as Least Recently Used (LRU). According to the LRU replacement algorithm, for each cache-line, the cache controller maintains in a register several status bits that keep track of the number of times in which the cache-line was last accessed. Each time one of the cache-lines is accessed, it is marked most recently used and the others are adjusted accordingly. A cache-line is elected to be flushed if it has been accessed (read or written to) less recently than any other cache-line. The LRU replacement policy is based on the assumption that, in general, the cache-line which has not been accessed for longest time is least likely to be accessed in the near future.

Other replacement schemes that are used include random replacement, an algorithm that picks any cache-line with equal probability, and First-In-First-Out (FIFO), algorithm that simply replaces the first cache-line loaded in a particular set or group of ache-lines.

Contrary to the above-stated assumptions, however, not all computer data structures have the same degree of locality. For example, some data-structures commonly used in sci-entific applications, such as global climate modeling and satellite image processing, have data arrays or sequential data that are accessed once by the processor and then not be accessed again for a relatively long time. This data, referred to herein as streaming-data, replaces data already present in the cache that is more likely to be required by the processor for subsequent processing, thereby resulting in a greater number of cache misses and lower cache performance. Streaming-data is particularly a problem for applications which require periodic or infrequent processing of very large amounts of streaming-data that can displace all data previously stored in the cache or even in multiple levels of caches.

Several approaches have been attempted to handle streaming-data while maintaining the cache performance or hit-ratio for non-streaming-data. One approach is described in U.S. Pat. No. 4,181,937, to Hattori et al., hereby incorporated by reference. Hattori teaches increasing the size of the cache or providing additional caches, i.e., victim caches, to which data displaced from the L1 or L2 cache is copied. However, this approach is not wholly satisfactory for a number of reasons. A fundamental problem with this approach is that the additional time needed to access the victim cache and copy data from the L1 or L2 to the victim cache offsets the advantages of the using cache memory and, in some instances can actually increase the memory latency period over systems without victim caches. Another problem is that because typically the victim cache is typically smaller than the L1 or L2 cache, the streaming-data will often completely displace data in the victim cache as well.

Yet another problem with merely providing larger or additional caches is the cost associated with implementing memory using more expensive memory devices such as SRAMs. This is counter to the purpose of hierarchal memory design which seeks to create the illusion of unlimited fast memory by providing a smaller amount of faster memory close to the processor and a larger amount of slower, less expensive memory below that.

SUMMARY

Accordingly, there is a need for a cache memory system and method of operating the system that is capable of identifying and efficiently handling streaming-data. In particular, there is a need for a system and method of operating a cache memory system having multiple levels of caches that reduces or eliminates displacement by streaming-data of data already stored in a cache that is likely to be needed in the near future. There is also a need for a system and method of operating a cache memory system having multiple levels of caches that reduces or eliminates displacement of data in a lower-level cache that may be needed by the processor in the future by streaming-data displaced from a higher-level cache.

The present invention overcomes the disadvantages of the prior art by providing a cache memory system and method for operating the same that provides an improved handling of streaming-data. By streaming-data it is meant data that having been accessed by a processor will not be accessed again for a relatively long time.

In one aspect, the present invention provides a method for operating a cache memory system having a cache with a number of cache-lines each capable of storing data transferred between a processor and a lower-level memory. In the method data is loaded or stored into at least one of the plurality of cache-lines and checked to determine if the data is streaming-data. In one embodiment, each cache-line has a streaming-data-bit associated therewith for indicating whether data-stored therein is streaming-data, and the cache memory system further includes a cache controller configured to determine if the streaming-data-bit is set.

In another embodiment, the cache is a set associative cache with the cache-lines grouped into a number of sets, and the cache memory system further includes a number of history queues, each history queue associated with one of the sets. The history queues are adapted to hold a sequence of numbers identifying the cache-lines in the associated set accessed in a first predetermined number, n, of preceding references to the set. In this embodiment, determining if the data in the cache-line is streaming-data involves setting the streaming-data-bit if data in the cache-line has been accessed less than a second predetermined number, k, of times in the preceding n references to the set.

In another aspect, the present invention is directed to a cache memory system further including a victim cache between the cache and the lower-level memory. A method of operating the cache memory system generally involves determining, using the cache controller, before loading data to an element in one of the cache-lines if the loading of data will replace earlier data already stored in the cache-line. If the loading of data will replace data in the cache-line, it is determined if the data that will be replaced is streaming-data. If the data to be replaced is not streaming-data, it is loaded in the victim cache. However, if the data to be replaced is streaming-data, it is not loaded into the victim cache, thereby improving system efficiency by eliminating the need to copy the data to be replaced and, possibly, avoiding replacing other earlier data in the victim cache that may be needed by the processor in the future.

The system and method of the present invention is particularly useful in a computer system having a processor and one or more levels of hierarchically organized memory in addition to the cache memory system. For example, the system and method of the present invention can be used in a cache memory system coupled between the processor and a lower-level main-memory. Alternatively, the system and method of the present invention can also be used in a buffer or interface coupled between the processor or main-memory and a mass-storage-device such as a magnetic, optical or optical-magnetic disk drive.

The advantages of the present invention include: (i) the ability to identify streaming-data-stored in a cache of a cache memory system, (ii) the ability to selectively copy only non-streaming-data displaced from the cache to a victim cache and (iii) the ability to selectively load data into a fully associative or set associative cache in such a manner as to preferentially replace streaming-data.

BRIEF DESCRIPTION OF THE DRAWINGS

These and various other features and advantages of the present invention will be apparent upon reading of the following detailed description in conjunction with the accompanying drawings, where.

DETAILED DESCRIPTION

The present invention is directed to cache memory systems and methods of operating the same that provide efficient handling of streaming-data.

Figure 3A:
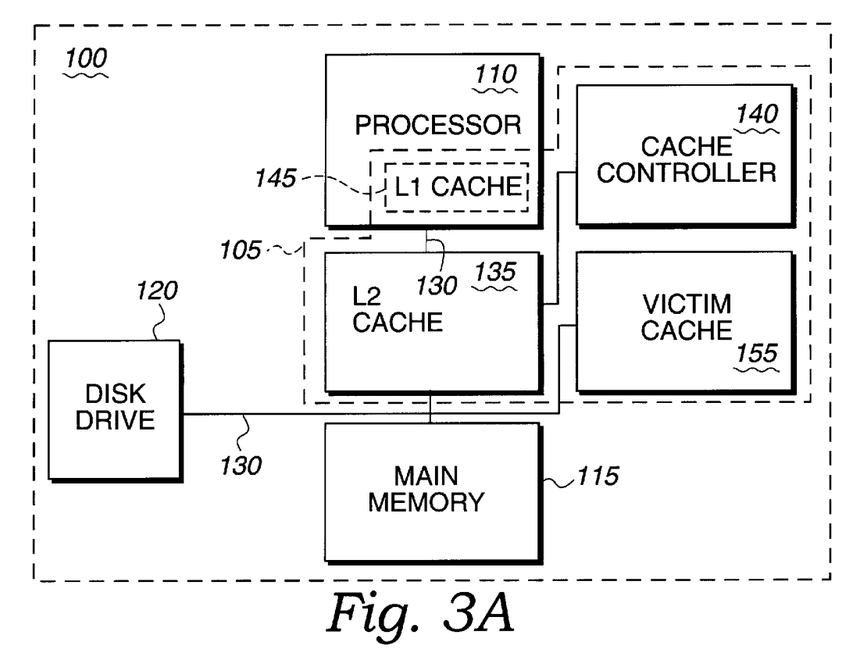
FIG. 3A is a block diagram illustrating a computer system having an embodiment of a cache memory system according to the present invention.

FIG. 3A shows a block diagram of an exemplary embodiment of a computer system 100 in which an embodiment of a cache memory system of the present invention can be incorporated. For purposes of clarity, many of the details of computer systems that are widely known and are not relevant to the present invention have been omitted. In addition to cache memory system 105, computer system 100 typically includes central processing unit (CPU) or processor 110 for executing instructions for a computer application or program (not shown), main-memory 115 for storing data and instructions while running the application, a mass-data-storage device, such as disk drive 120, for a more permanent storage of data and instructions, system bus 130 coupling components of the computer system, and various input and output devices such as a monitor, keyboard or pointing device (not shown).

Cache memory system 105 has a cache memory or cache separate and distinct from the processor, shown here as level 2 (L2) cache 135, for temporarily storing data and instructions recently read from or written to lower level main-memory 115 or mass-storage-device 120. Cache controller 140 controls operation and content of cache 135 by controlling mapping of memory addresses in the cache and the replacement of data in the cache in accordance with a cache replacement policy. Optionally, cache memory system 105 can further include primary or level 1 (L1) cache 145 integrally formed with processor 110 and one or more level 3 (L3) or victim caches 155 for temporarily storing data replaced or displaced from the L1 or L2 cache to speed up subsequent read or write operations. L1 cache 145 typically has a capacity of from about 1 to 64 KB, while lower-level L2 and L3 caches 135, 155, can have capacities of from about 128 KB to 64 MB in size. Although not shown, cache memory system 105 can also have separate caches for instructions and data, which can be accessed at the same time, thereby allowing an instruction fetch to overlap with a data read or write.

The caches 135, 145, 155, can be organized as directly-mapped, fully-associative or set-associative caches as described above. In one embodiment, to realize the fullest advantages of the present invention as explained below, the caches are organized as n-way set-associative caches, where n is an integer of two or more.

Figure 3B:
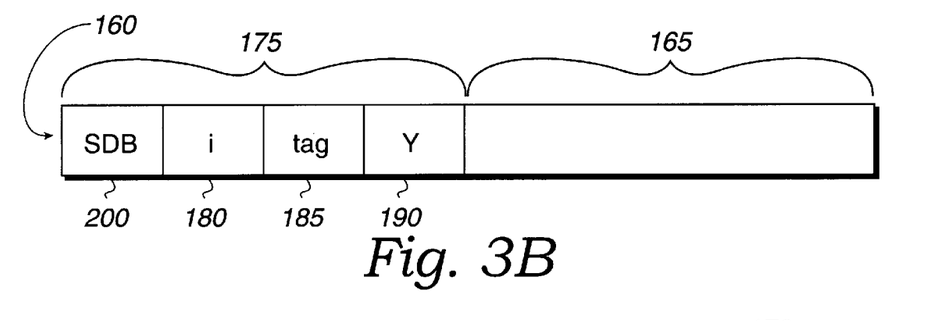
FIG. 3B is a block diagram illustrating a schema of a cache-line in the cache memory system of FIG. 3A according to an embodiment of the present invention.

FIG. 3B illustrates a schema of cache-line 160 of cache 135, 145, 155, in cache memory system 105 of FIG. 3A. Cache-line 160 includes data-store 165 capable of storing multiple blocks or bytes of data, and tag-field 175 containing address information and control bits. The address information provide information on where in the cache entries in the data-store can be found. The address information also includes index 180 (often implicit, as noted above) that uniquely identifies each cache-line 160 in cache 135, 145, 155, and a plurality of tags 185, one for each way, that is used in combination with index 180 to identify an address in main-memory 115 from which data-stored in the cache-line has been read from or written to. Control bits can include validity bit 190 which indicates if the cache-line contains valid data, bits for implementing a replacement algorithm, a dirty-data-bit for indicating whether data in the cache-line has been modified but not written-back to lower-level memory, and, in accordance with the present invention, a FIFO-bit or streaming-data-bit 200 or bits for indicating whether the cache-line contains streaming-data or non-streaming-data. Streaming-data-bit 200 can be set by cache controller 140 using various hardware or software means, as explained infra, or by an operating system or application running on computer system 100. In accordance with the present invention, cache controller 140 is configured to monitor or check the status of streaming-data-bit 200 to provide more efficiently handling of streaming and nonstreaming-data, thereby raising the cache hit-ratio and improving cache performance.

Figure 3C:
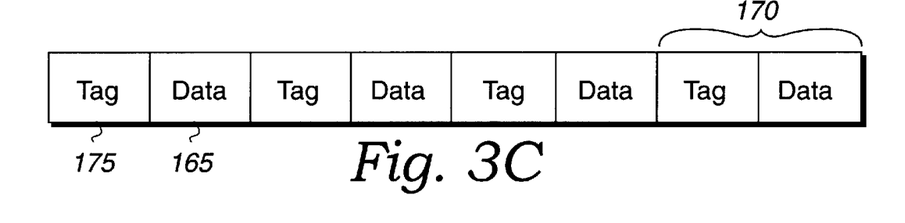
FIG. 3C is a block diagram illustrating a schema of a set in a four-way set associative cache according to an embodiment of the present invention.

FIG. 3C is a block diagram illustrating a schema of a set in a four-way set associative cache according to an embodiment of the present invention. Each way 170 has a data store 165 and tag-field 175 associated therewith. In accordance with the present invention, tag-field 175 includes a streaming-data-bit 200 that is used to indicate whether data store 165 includes streaming-data. Alternatively, as explained in detail below, at least one way 170 in each set 205 can be reserved for storing only streaming data, and cache controller 140 upon determining the data is streaming data can cache the data in one of the reserved ways (not shown), thereby identifying it as streaming-data. Thus, eliminating the need for the streaming-data-bit 200.

To better illustrate the advantages of the present invention, operation of cache memory system 105 will now be described.

The process begins with a request from processor 110 to fetch instructions or data from memory. Cache controller 140 checks to see if the requested information is available in one of caches 135, 145, 155, while simultaneously a memory controller (not shown) begins the process of accessing main-memory 115. This minimizes the loss of time in the event of a cache-miss.

Cache controller 140 checks for a cache-hit by looking in the cache at cache-line 160, or in the case of a set-associative cache a set of cache-lines, at a location derived from an address provided by processor 110. For example, for cache memory system 105 as described above in which sixty-four (64) MB of main-memory 115 is mapped to a five hundred and twelve (512) KB cache 135 having thirty-two (32) blocks per cache-line 160, processor 110 provides a twenty-six (26) bit address, A0 to 25, to cache controller 140. The lowest five bits (A0 to A4) are used to differentiate between the thirty-two different blocks mapped to different ways or elements 170 in the cache-line and hence are ignored by cache controller 140. In a direct mapped cache, the next 14 bits (A5 to A18) represent index 180 of cache-line 160 that cache controller 140 needs to check (note that $2^{14}$ is 16,384 the number of cache-lines in a 512 KB cache). In a 4-way set associative cache, for example, in which the cache is divided into 4,096 sets of 4 cache-lines each and, in which there are 16,384 addresses in main-memory 115 associated with each set, address bits A5 to A18 of the memory address represent index 180 of the set that cache controller 140 needs to check. Cache controller 140 next reads tag 185 of cache-line 160, or set of cache-lines, indicated by address bits A5 to A18 to determine if the desired data is stored in that cache-line, or set of cache-lines, and compares the tag to the highest 7 address bits, A19 to A25. If tag 185 and the address bits are identical, then it is a cache-hit. Cache controller 140 reads the contents in data-store 165 of indicated cache-line 160 to processor 110 and cancels the partially-completed read of main-memory 115.

However, if tag 185 doesn't match address bits A19 to A25 it is a cache-miss. The read of main-memory 115 started earlier is completed, with 32 blocks of data being read from main-memory at the location specified by bits A5 to A25. These bytes are fed to processor 110, while simultaneously cache controller 140 stores the data to cache 135, 145, 155, at cache-line 160, or to one of the cache-lines in a set of cache-lines, indicated by address bits A5 to A25. If cache memory system 105 includes victim or L3 cache 155, as shown in FIG. 3A, earlier data already present in the indicated cache-line can be copied to the victim cache.

In accordance with one aspect of the present invention, cache memory system 105 further includes victim cache 155 between higher level L1 and L2 caches 145, 135, and main-memory 115. Cache memory system 105 is configured and operated so that streaming-data displaced from L1 or L2 caches 145, 135, is not written to victim cache 155, preventing streaming-data from displacing data in victim cache 155 that may be needed by processor 110 in the future (non-streaming-data), and thereby preserving the non-streaming-data at a higher-level more closely coupled to the processor and speeding up subsequent read and write operations.

Figure 4:
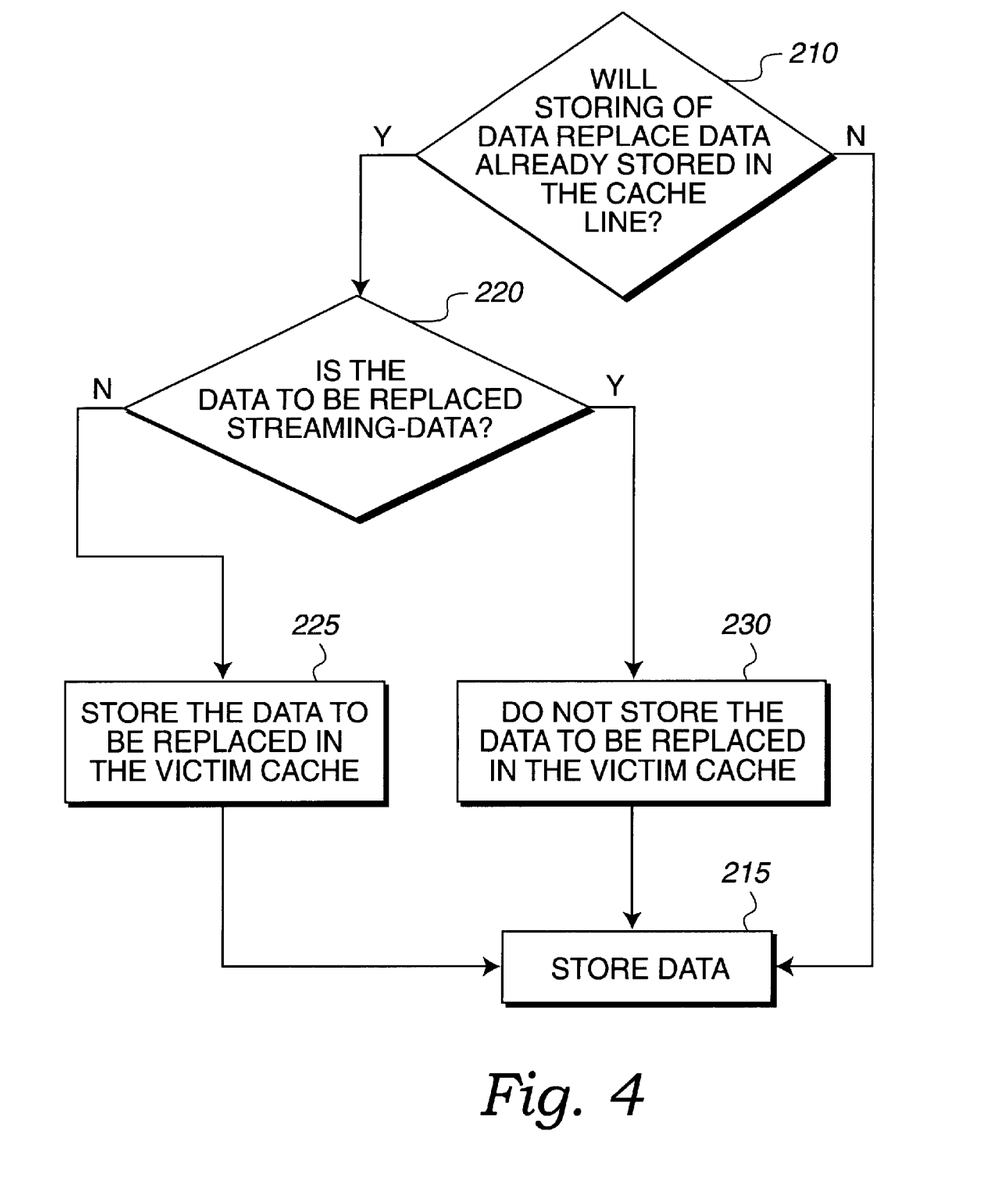
FIG. 4 is a flowchart showing an embodiment of a process for operating a cache memory system having a victim cache between a primary cache and a lower-level memory according to an embodiment of the present invention.

A method for operating cache memory system 105 to eliminate displacement of non-streaming-data in victim cache 155 will now be described with reference to FIGS. 3A and 4. FIG. 4 is a flowchart showing an embodiment of a process for operating cache memory system 105 having victim cache 155 between primary cache 145 and lower-level memory 115 according to an embodiment of the present invention. In the method, it is determined before loading data to an element 170 in one of the cache-lines if the loading of data will replace earlier data already stored in the cache-line. (Step 210) If no data will be replaced, the data to be stored is stored in L1 or L2 cache 145, 135. (Step 215) However, if the loading of data will replace data in cache-line 160, it is determined if the data that will be replaced is streaming-data. (Step 220) If the data to be replaced is not streaming-data, it is loaded in victim cache 155. (Step 225) If the data to be replaced is streaming-data, it is not loaded into victim cache 155 (step 230), and the data to be stored is stored in L1 or L2 cache 145, 135. (Step 215).

The step of determining whether the data to be replaced is streaming-data, step 220, is accomplished by one of the methods described in more detail below. For example, the step can involve checking the status of a previously set streaming-data-bit 200 associated with element 170 or cache-line 160.

Figure 5:
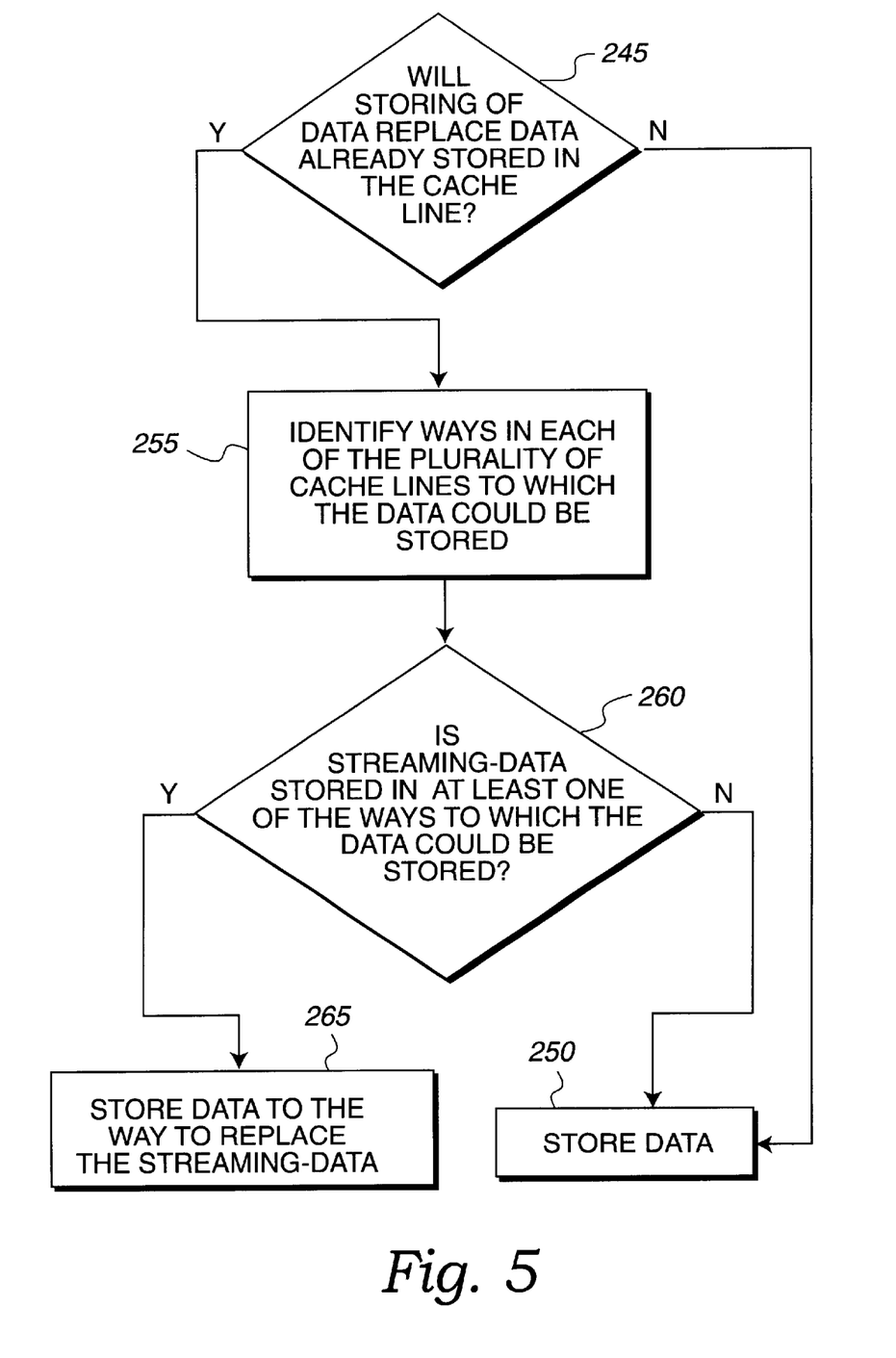
FIG. 5 is a flowchart showing an embodiment of a process for operating a cache memory system having an associative mapping scheme to provide an improved cache replacement policy according to an embodiment of the present invention.

In another aspect, cache memory system 105 has fully-associative or set-associative caches 135, 145, 155, and is configured and operated to provide a replacement policy or scheme that selectively replaces streaming-data first, thereby affording longer residency of non-streaming-data in L1 or L2 caches and improving the cache hit-ratio. A method of implementing this replacement policy will now be described with reference to FIG. 5. FIG. 5 is a flowchart showing an embodiment of a process for operating cache memory system 105 having an associative mapping scheme to provide an improved cache replacement policy according to an embodiment of the present invention. Again, in the method, it is determined before loading data if the loading of data will replace data already stored in cache-line 160. (Step 245) If no data will be replaced, the data to be stored is simply stored in L1 or L2 cache 145, 135. (Step 250) However, if the loading of data will replace data in cache-line 160, elements 170 in each of the cache-lines to which the data could be loaded are identified (step 255), and it is determined if streaming-data is stored in any of these elements (step 260). If streaming-data is stored in at least one of elements 170 to which the data could be loaded, the data is loaded into an element selected to replace the streaming-data. (Step 265) Otherwise, the data is simply loaded into any one the possible elements (step 250) either at random or using a secondary replacement algorithm, such as Least-Recently-Used (LRU) algorithm, described above. In one version of this embodiment, cache memory system 105 uses a set-associative mapping scheme, and the step of determining if streaming-data is stored in at least one of the ways to which the data could be loaded, step 260, involves determining if streaming-data is stored in at least one of elements 170 in one of cache-lines 160 in a set to which data is to be loaded.

Methods of identifying streaming-data according to various embodiments of the present invention will now be described.

Figure 6:
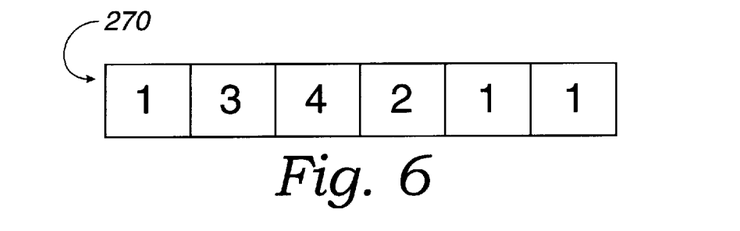
FIG. 6 is a block diagram illustrating a schema of a history queue according to an embodiment of the present invention.

In one embodiment, cache memory system 105 further includes a number of history queues 270 associated with each set in a set-associative cache to track the order in which cache-lines in the set are accessed in preceding references to the set. An exemplary, block diagram illustrating a schema of an embodiment of history queue 270 is shown in FIG. 6. Referring to FIG. 6, the history queue holds N element numbers identifying cache-lines 160 of the set that were referenced for each of the last N references to the set, where N is a first predetermined whole number greater than or equal to two.

Figure 7:
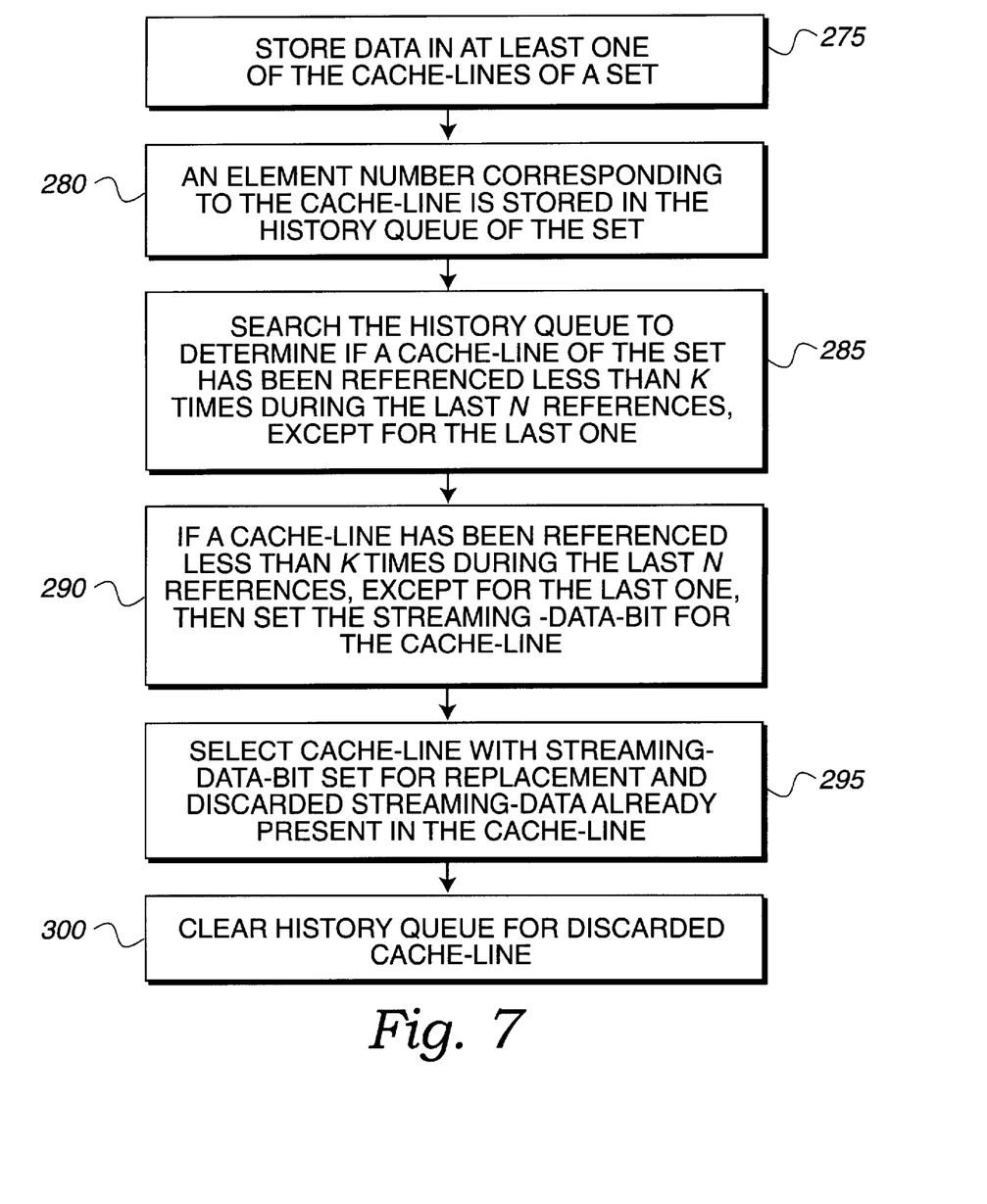
FIG. 7 is a flowchart showing an embodiment of a process for operating a cache memory system using a history queue to determine if the data is streaming-data according to an embodiment of the present invention.

A method for operating cache memory system 105 to determine if data in cache-line 160 is streaming-data using history queue 270 will now be described with reference to FIG. 7. In the method, data is stored in at least one of cache-lines 165 of a set (Step 275) and an element number corresponding to the cache-line is stored in the history queue of the set. (Step 280) On each of the subsequent references to the set, history queue 270 is searched by cache controller 140 to determine if cache-line 160 of the set has been referenced less than K times during the last N references, except for the last one, where K is a second predetermined whole number between 2 and N inclusive. (Step 285) If cache-line 160 has been referenced less than K times during the last references, except for the last one, then the streaming-data-bit 200 is set for that cache-line (Step 290), and, as described above, the cache-line is preferentially selected for replacement by the replacement policy and/or discarded rather than being written to victim cache 155 where it could displace non-streaming-data. (Step 295) When cache-line 160 has been replaced or discarded the references in the cache-line are cleared from history queue 270. (Step 300) Advantageously, N is greater than three to provide a sufficient residency of non-streaming-data in L1 or L2 caches 145, 135, thereby improving the cache hit-ratio. More advantageously, N is less than about 8 to allow streaming-data to be quickly identified and to reduce the time necessary for cache controller 140 to search history queues 270.

Alternatively, the step of determining whether data is streaming-data is accomplished by recognizing software hints or special instructions in requests from processor 110 or a compiler (not shown) that indicate the request is to cache streaming-data. A compiler is a program that converts another program from a source or programming language to machine language or object code.

Figure 8:
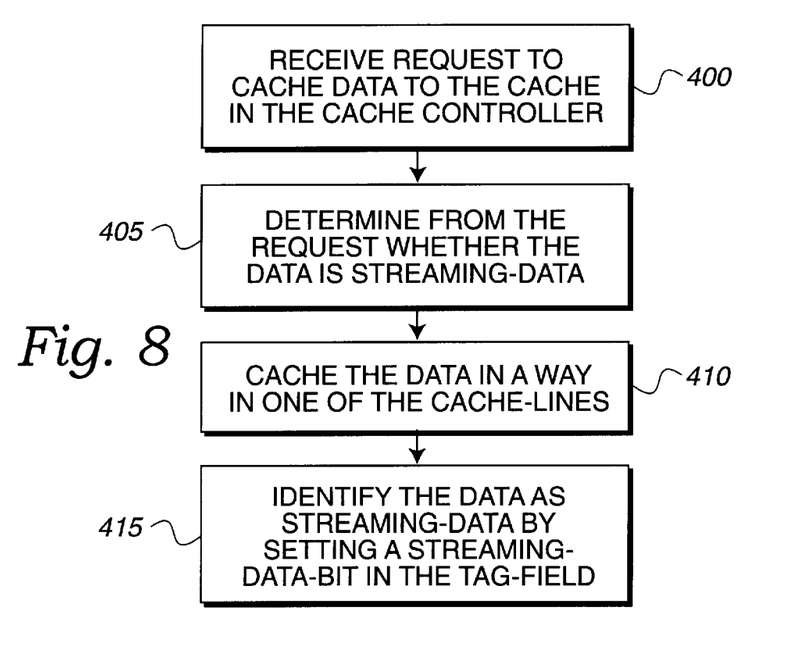
FIG. 8 is a flowchart showing an embodiment of a process for using special load and store memory instructions to identify streaming-data according to an embodiment of the present invention.

In one version of this embodiment, shown in FIG. 8, special load instructions are used to load streaming-data from main-memory 115 and special store instructions are used to store streaming-data to main-memory. Referring to FIG. 8, in the method the request to cache data to cache 135 is received in cache controller 140 (step 400), it is determined from the request whether the data is streaming-data (step 405) and the data is cached in a way in one of cache-lines 160 (step 410). Generally, the special instruction can take the form of LOAD_STREAMING_DATA [A], R or STORE_STREAMING_DATA R, [A], where A is an address of the data in main-memory 115 and R is a register in processor 110 to which the data is to be loaded to. Optionally, the method further includes the step of setting streaming-data-bit 200 in tag-field 175 to identify the data as streaming-data (step 415).

Alternatively, at least one way 170 in each cache-line 160 can be reserved for storing only streaming data, and cache controller 140 upon determining the data is streaming data can cache the data in one of the reserved ways (not shown), thereby identifying it as streaming-data. This embodiment has an advantage of providing a cache that can be reconfigured to handle varying amounts of streaming-data. For example, a cache memory system in a computer system running applications using large amounts of streaming data, i.e., those accessing large stacks of data or using vector programming, can be configured to reserve several ways in each cache-line for streaming data. In addition, cache 135 can be configured to reserve multiple ways 170 in each cache-line for different classes of streaming-data, thereby providing some permanence for different classes of streaming-data. Reserved ways 170 can be identified by setting a bit or bits associated with each way during booting or initialization of cache memory system 105 identifying the way as reserved for streaming-data. Alternatively, reserved ways 170 can be identified using a separate register to store a value identifying each reserved way, or by specifying during initialization of cache memory system 105 the reserved ways. For example, way number four of every cache-line 160 can be designated during initialization as being reserved for streaming-data.

Figure 9:
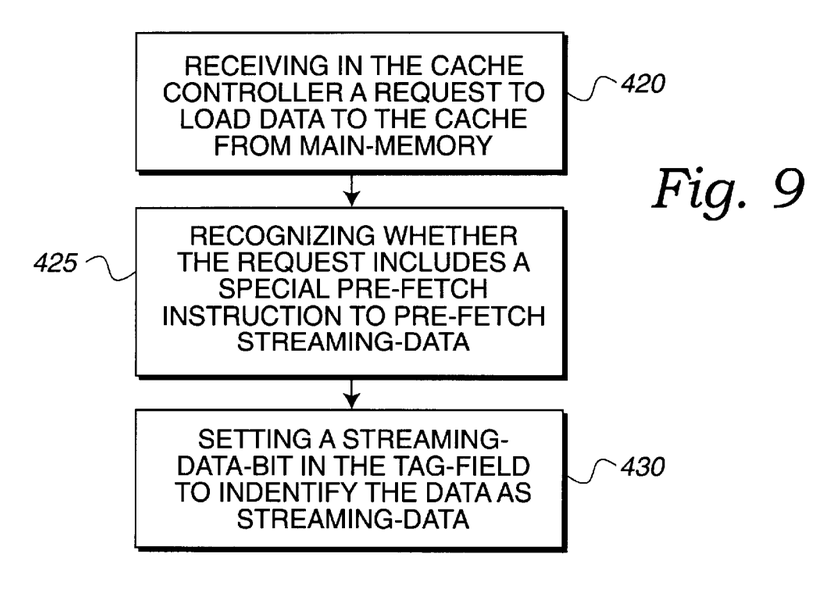
FIG. 9 is a flowchart showing an embodiment of a process for using read-once and write-once software pre-fetch instructions to identify streaming-data according to an embodiment of the present invention.

In another version of this embodiment, shown in FIG. 9, the step of determining whether data is streaming-data involves receiving from the compiler a special compiler-directed pre-fetching instruction to load data from main-memory 115. By pre-fetching it is meant the act of identifying and moving the identified data to cache 135 before it is actually needed by processor 110. Referring to FIG. 9, the method of determining whether the data is streaming-data involves receiving in cache controller 140 a request to load data to cache 135 from main-memory 115 (step 420), and recognizing whether the request includes a special pre-fetch instruction to pre-fetch streaming-data from main-memory. (step 425) The special instruction can take the form, for example, of PREFETCH [A], STREAMING_DATA, where A is the address of the data in main-memory 115. In another version of this embodiment, the pre-fetch instruction includes a kinds-field, and the step of determining from the request whether the data is streaming-data includes the step of recognizing a special variant in the kinds-field. For example, the variant in the kinds-field can take the form of READ_ONCE or WRITE_ONCE. Thus, data which is pre-fetched using a pre-fetch instruction with READ_ONCE in the kinds-field would be determined to be streaming-data. As above, the method can optionally further include the step of setting streaming-data-bit 200 in tag-field 175 to identify the data as streaming-data (step 430). Alternatively, the data can be saved to way 170 reserved for caching streaming-data, as described above, thereby identifying it as streaming-data.

In yet another version of this embodiment, processor 110 has an architecture supporting alternate address space indexing and alternate or special load instructions, and the step of determining whether data is streaming-data involves receiving from processor 110 an alternate instruction that indicates the data to be cached is streaming data. For example, processor 110 can have a SPARC® architecture supporting Alternate Space Indexing (ASI), and the step of determining whether the data is streaming-data can include the step of receiving from the processor an ASI instruction to cache streaming-data. SPARC® or scalable processor architecture is an instruction set architecture designed by Sun Microsystems, Inc., of Palo Alto, Calif. to streamline and improve the speed of the processor. ASI instructions are an alternate set of load (or store) instructions originally developed for running diagnostics on the processor and for providing access to memory not accessible using ordinary instructions (non-faulting memory). There are 256 possible ASI address spaces available at which instructions can be stored. The ASI instruction used can take the form of LOAD [A], [ASI], R, or STORE [A], [ASI], where A is the address of the data in main-memory 115, R is a register in processor 110 to which the data is to be loaded and ASI is a number representing one of 256 possible ASI address spaces that is pre-selected to signify streaming-data.

It is to be understood that even though numerous characteristics and advantages of certain embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A method for operating a cache memory system having a cache with a plurality of cache-lines each capable of storing data, wherein the cache has the plurality of cache-lines grouped into a plurality of sets, the method comprising the steps of:

storing data in at least one of the plurality of cache-lines;

storing a sequence of numbers identifying the cache-lines in a particular one of the sets accessed in a first predetermined number, n, of preceding references to the set; and setting a streaming-data-bit to identify data in a particular cache-line as streaming-data if the cache-line has been accessed less than a second predetermined number, k, times in the preceding n references to the set.

2. A method according to claim 1 wherein the cache memory system further comprises a victim cache between a lower level memory and the cache, and wherein the method further comprises the initial steps of:

determining prior to the step of storing data if the storing of data will replace data already stored in the cache-line;

if the storing of data will replace data in the cache-line, determining if the data to be replaced is streaming-data;

if the data is to be replaced is not streaming-data, storing the data to be replaced in the victim cache; and if the data is to be replaced is streaming-data, not storing the data to be replaced in the victim cache.

3. A method for operating a cache memory system having a cache with a plurality of cache-lines each capable of storing data, wherein the cache is a set associative cache with the plurality of cache-lines grouped into a plurality of sets, the method comprising the steps of:

storing data in at least one of the plurality of cache-lines; and determining if the data is streaming-data, the determining operation comprising the steps of:

provided a plurality of history queues, each of the history queues being associated with one of the plurality of sets and each of the history queues being adapted to hold a sequence of numbers identifying the cache-lines in the associated set accessed in a first predetermined number, n, of preceding references to the set; and setting a streaming-data-bit to identify data in the cache-line as streaming-data if the cache-line has been accessed less than a second predetermined number, k, times in the preceding n references to the set.

4. A cache memory system comprising:

a cache having a plurality of cache-lines capable of storing data, each cache-line having associated therewith a streaming-data-bit capable of indicating whether data stored in the cache-line is streaming-data;

a cache controller configured to store data in one of the plurality of cache-lines, the cache controller further configured to determine if the data is streaming-data; and a plurality of history queues, each of the history queues being adapted to hold a sequence of numbers identifying the cache-lines in the associated set accessed in a first predetermined number, n, of preceding references to the set.

5. A cache memory system according to claim 4 wherein the cache memory system further comprises a victim cache between a lower level memory and the cache, and wherein the cache controller is configured to:

determine prior to storing of data in one of the plurality of cache-lines if the storing of data will replace data already stored in the cache-line;

if the storing of data will replace data in the cache-line, determine if the data to be replaced is streaming-data;

if the data is to be replaced is not streaming-data, store the data to be replaced in the victim cache; and if the data is to be replaced is streaming-data, not store the data to be replaced in the victim cache.

6. A cache memory system comprising:

a cache having a plurality of cache-lines capable of storing data, each cache-line having associated therewith a streaming-data-bit capable of indicating whether data stored in the cache-line is streaming-data, wherein the cache is a set associative cache with the plurality of cache-lines grouped into a plurality of sets;

a cache controller configured to store data in one of the plurality of cache-lines, the cache controller further configured to determine if the data is streaming-data; and a plurality of history queues, each of the history queues being associated with one of the sets and each of the history queues being adapted to hold a sequence of numbers identifying the cache-lines in the associated set accessed in a first predetermined number, n, of preceding references to the set.

7. A cache memory system according to claim 6 wherein the cache controller is configured to set the streaming-data-bit to identify data in a cache-line in one of the plurality of sets as streaming-data if data in the cache-line has been accessed less than a second predetermined number, k, times in the preceding n references to the set.

8. A cache memory system for storing data, the cache memory system comprising:

a cache having a plurality of cache-lines capable of storing data, wherein the cache is a set associative cache with the plurality of cache-lines grouped into a plurality of sets;

a cache controller configured to store data to a way in one of the plurality of cache-lines; and means for determining if the data stored in the way is streaming data, wherein the means for determining if data stored in the way is streaming-data comprises a plurality of history queues, each of the history queues being associated with one of the plurality of cache-lines and each of the history queues being adapted to hold a sequence of numbers identifying the cache-lines in the associated set accessed in a first predetermined number, n, of preceding references to the set.

9. A cache memory system according to claim 8 wherein the cache controller is further configured to set a streaming-data-bit associated with each way in each of the plurality of cache-lines to identify data as streaming-data if data in the cache-line has been accessed less than a second predetermined number, k, of times in the preceding n references to the set as recorded in the history queue.

* * * * *